(12) United States Patent
Smith

(10) Patent No.: US 6,564,830 B1
(45) Date of Patent: May 20, 2003

(54) METHOD AND APPARATUS FOR MANAGING FLUID PRESSURE USING AN ACCUMULATOR

(75) Inventor: David P. Smith, Joliet, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 10/020,016

(22) Filed: Dec. 7, 2001

(51) Int. Cl.$^7$ ................................................ F16L 55/04
(52) U.S. Cl. ..................... 138/30; 138/31; 220/721; 303/87
(58) Field of Search ................ 138/30, 31, 26; 220/721; 303/87

(56) References Cited

U.S. PATENT DOCUMENTS

| | | | | |
|---|---|---|---|---|
| 2,283,439 A | | 5/1942 | Herman .................. 138/30 |
| 2,290,337 A | | 7/1942 | Knauth .................. 138/30 |
| 2,682,893 A | | 7/1954 | Ziebold .................. 138/30 |
| 2,731,037 A | | 1/1956 | Schindler et al. .............. 138/30 |
| 3,410,440 A | | 11/1968 | Thomas .................. 220/4.2 |
| 3,714,964 A | * | 2/1973 | Livingston .................. 138/31 |
| 4,177,837 A | | 12/1979 | Frank et al. .................. 138/31 |
| 4,343,477 A | * | 8/1982 | Bridges .................. 138/31 |
| 4,610,369 A | | 9/1986 | Mercier .................. 138/30 X |
| 4,712,780 A | | 12/1987 | Ficht et al. .................. 267/256 |
| 4,997,009 A | * | 3/1991 | Niikura et al. .................. 138/30 |
| 5,133,387 A | | 7/1992 | Pietrykowski et al. ......... 138/30 |
| 5,427,152 A | | 6/1995 | Weber .................. 138/30 |
| 5,492,311 A | | 2/1996 | Kurr et al. .................. 267/140 |
| 5,618,629 A | | 4/1997 | Takamatsu et al. ...... 138/141 X |
| 5,845,749 A | | 12/1998 | Moretz et al. .............. 188/281 |
| 6,058,976 A | | 5/2000 | LeRossignol et al. ......... 138/30 |
| 6,286,552 B1 | * | 9/2001 | Shimbori et al. .............. 138/31 |
| 6,494,545 B2 | * | 12/2002 | Nakamura et al. ............ 138/30 |

* cited by examiner

Primary Examiner—Patrick Brinson
(74) Attorney, Agent, or Firm—Steve M Hanley

(57) ABSTRACT

An accumulator assembly for managing pressurized fluid includes a housing and a partition provided in the housing moveable in response to fluid pressure imparted on the partition. A deflection member is disposed in the housing and is displaceable between a first position and a second position. The deflection member includes at least one deflection element including a first end and a second end and a flexing portion therebetween. The deflection member provides a resistive force between the first and the second positions of the deflection member in response to movement of the partition. The resistive force is substantially constant between the first and said second positions of the deflection member.

12 Claims, 5 Drawing Sheets

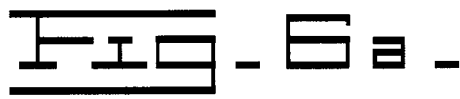 
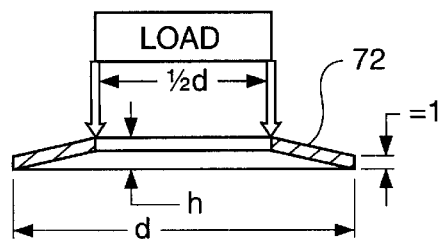 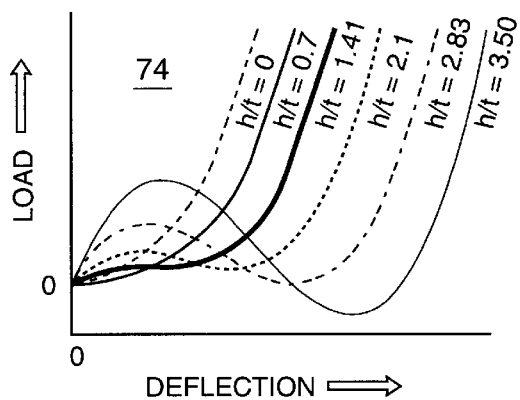
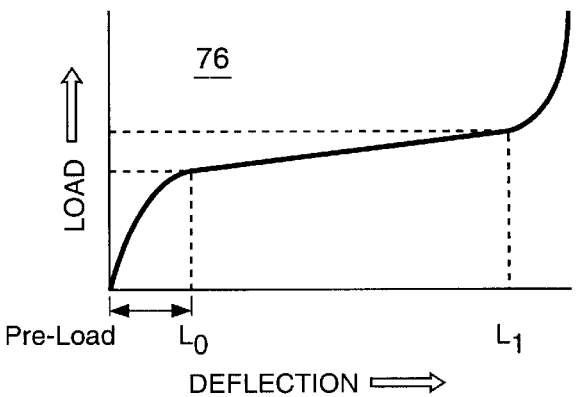

METHOD AND APPARATUS FOR MANAGING FLUID PRESSURE USING AN ACCUMULATOR

TECHNICAL FIELD

This invention relates to managing (i.e., charging and discharging pressurized fluid) from a fluid receiving structure. More specifically, this invention relates to an accumulator which receives fluid pressure and is configured to store and subsequently discharge the fluid pressure.

BACKGROUND

Fluid circuits which include an energy storage capability for the purpose of capturing fluid energy produced by the circuit and thereafter discharging are well known. It is common to employ a containment vessel, such as an accumulator to store a significant volume of fluid. In addition to fluid storage these containment vessels include an internal mechanism which pressurizes the fluid being received therein such that the fluid may be later discharged at a significantly elevated pressure.

One type of well-known accumulator is the gas filled accumulator which includes an internal mechanism consisting of a gas filled bladder. As fluid pressure from a fluid circuit is introduced into the accumulator to "charge" the accumulator, the bladder and the gas within is compressed resulting in the fluid contained within the accumulator being pressurized. U.S. Pat. No. 2,283,439 issued to Herman, illustrates such an accumulator and gas filled bladder or diaphragm.

One problem with the gas filled accumulator is that the diaphragm is prone to rupture and periodic maintenance and consequently, increased cost of maintenance. Additionally, a significant cost is attributable to ensuring that the bladder and the pressure vessel of the accumulator are designed pursuant to compressible gas pressure vessel regulations. Moreover, the bladder is often constructed of an elastomeric material which exhibits performance degradation, and possibly performance failure, with elevated operating temperatures.

Another type of accumulator is the piston type accumulator having a pressure vessel cylinder, a reciprocable plunger therein and a spring to resist plunger movement which provides a charge to the fluid introduced into the cylinder. One advantage of the piston type accumulator is that compressible fluid is not required within the vessel since the pressurizing mechanism is provided by a spring force imparted on the plunger. U.S. Pat. No. 5,845,749 issued to Moretz et al. is one example of a piston type accumulator.

One problem with the piston type accumulator is that either a series of springs or one large spring is required if high-pressure usage is warranted. It is known to employ a nested arrangement of Bellville springs to provide a large spring force. Yet, even with multiple Bellville springs the range of deflection, and associated storage volume capability is limited. Moreover, since Bellville springs develop a high force over a small deflection the stress within the spring materials becomes significant and, as a result, premature failure and/or periodic maintenance of these springs is common. Also, the outer extents of the springs develop high contact forces as each spring is collapsed and consequently, the contacting surfaces (i.e., the surface between springs and/or the spring/plunger interface) experience premature wear and failure.

Therefore, an accumulator having high-pressure capabilities, and additionally, a significant volume capacity which, in turn, would charge and discharge substantially all of the fluid contained therein at a substantially constant pressure would be desirable.

SUMMARY OF THE INVENTION

The present invention provides an accumulator assembly for storing pressurized fluid including a housing and a partition provided in the housing being moveable in response to fluid pressure imparted on the partition. A deflection member is disposed in the housing and is displaceable between a first position and a second position. The deflection member includes at least one deflection element including a first end and a second end and a flexing portion therebetween. The deflection member provides a resistive force between the first and the second positions of the deflection member in response to movement of the partition. The resistive force is substantially constant between the first and said second positions of the deflection member.

The present invention further provides a method for managing pressurized fluid using an accumulator assembly and the accumulator assembly includes a housing, a partition provided in the housing and moveable in response to fluid pressure being imparted on the partition, and a deflection member disposed in the housing. The method includes receiving fluid pressure within said housing; displacing the deflection member from a first position to a second position in response to the fluid pressure being received in the housing; and causing a substantially constant force on the partition through the deflection member between the first and second positions of the deflection member.

BRIEF DESCRIPTION OF THE DRAWINGS

The above-mentioned and other features of this invention, and the manner of attaining them, will become more apparent and the invention itself will be better understood by reference to the following description of the embodiments of the invention taken in conjunction with the accompanying drawings, wherein:

FIG. 6A is a sectional view of a known Bellville spring;

FIG. 6B is a load versus deflection diagram for a range of Bellville springs pursuant to FIG. 6A; and FIG. 7 is a load versus deflection diagram for the deflection member of FIG. 1, illustrating a constant load over the range of deflection.

DESCRIPTION

Figure 1:
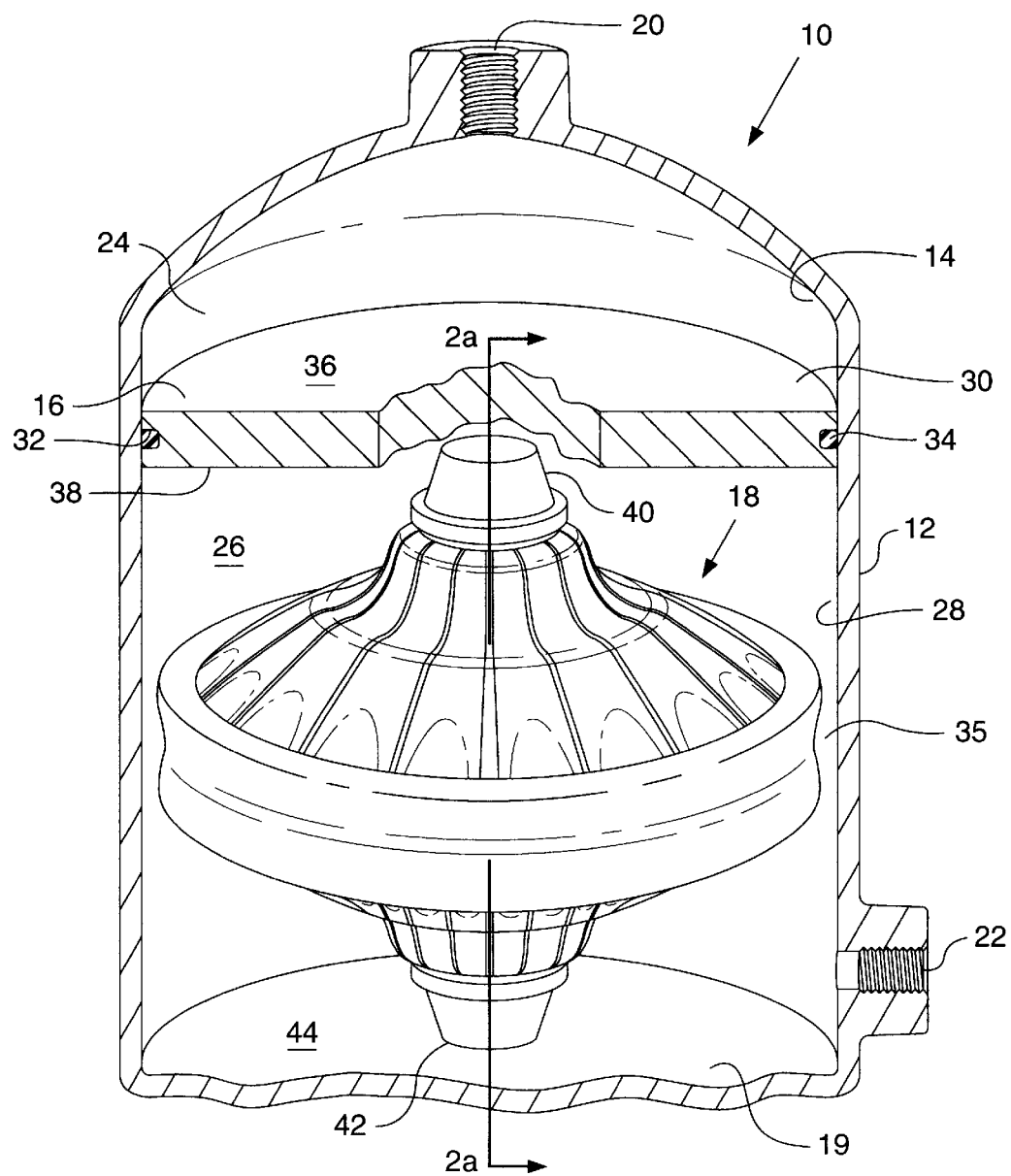
FIG. 1 is a perspective view of a first embodiment of an accumulator according to the present invention showing the accumulator housing in section.

Reference will now be made in detail to the exemplary embodiments of the invention, examples of which are illustrated in the accompanying drawings. Wherever possible, the same reference numbers will be used throughout the drawings to refer to the same or like parts and certain corresponding elements are denoted by primed reference numerals.

Referring to FIG. 1, shown is a first embodiment of an accumulator assembly including a housing 12 and a reciprocable partition 16 within an inner cavity 14 thereof. The accumulator assembly 10 includes a deflection member 18, provided within the inner cavity 14, that is positioned between the partition 16 and an end 19 of the housing 12. The housing 12 includes an inlet port 20 and a pressure relief port 22.

The inner cavity 14 of the housing 12 is separated into a fluid chamber 24 and a spring chamber 26 by the partition 16. The inner cavity 14 of the housing 12 is generally cylindrical and includes an inner surface 28. The partition 16 includes a perimeter portion 30 having a groove 32 provided therein. An O-ring 34 occupies the groove 32 to form a moveable seal between the partition 16 and the inner surface 28 forming a portion of the cavity 14.

Within the spring chamber 26, a periphery of the deflection member 18 is separated from the inner surface 28 of the housing 12 by an annular gap 35 so that the deflection member 18 may be compressed without interference from the inner surface 28.

Figure 2A:
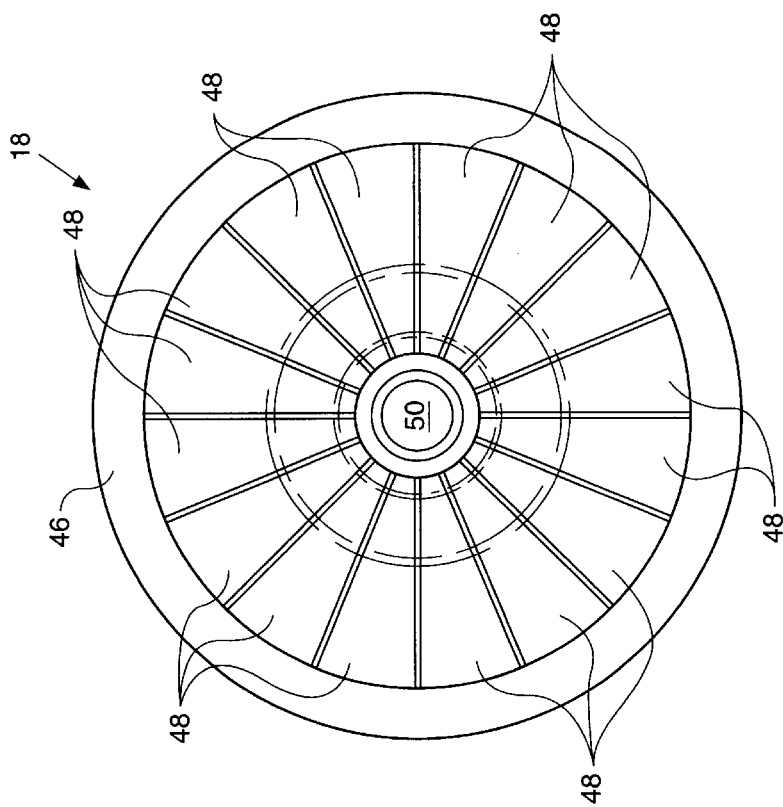
FIG. 2A is a sectional view of the deflection member of FIG. 1 taken along line 2A—2A of FIG. 1, showing the deflection member removed from the accumulator and the deflection member unloaded.
Figure 3:
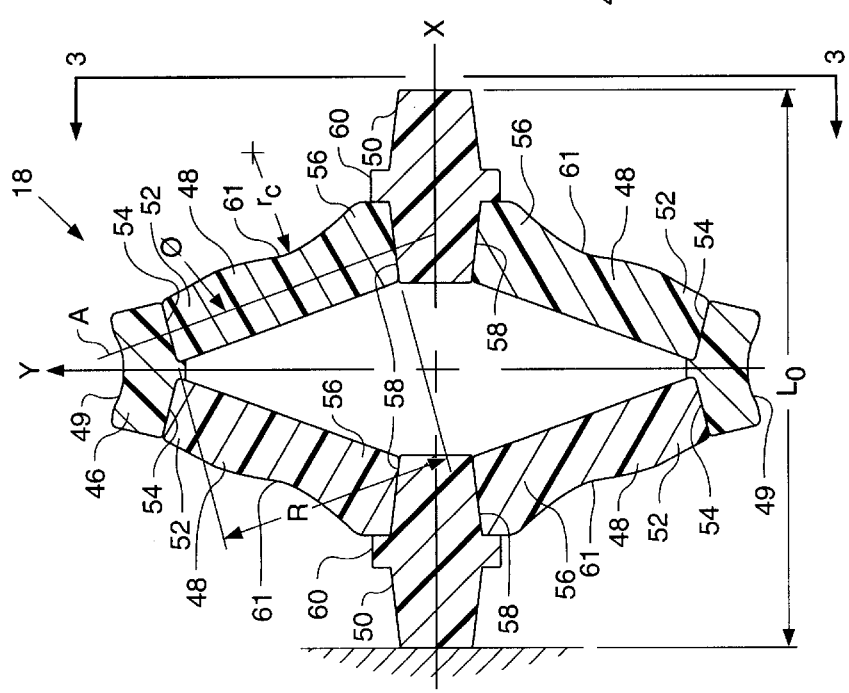
FIG. 3 is a plan view of the deflection member of FIG. 1 along viewed along line 3—3 of FIG. 2.

Referring to FIG. 2A, the deflection member, 18 includes an annular base member 46, a plurality of deflection elements 48 (FIG. 3) and a pair of retainers 50. Each deflection element includes a first end 48 engaged with an inner portion 54 of the base member 46. Each deflection element 48 includes a second end 56 engaged with a surface 58 of the retainer 50. The first ends 52 and second ends 56 may be inteference fitted, bonded or be one piece respectively with the base member 46 and the retainers 50. It may be seen that each retainer 50 includes a flange portion 60 to ensure a secure engagement between each retainer 50 and the respective second end 56 of each deflection element 48. It is envisioned that the deflection member 18 may include many deflection members, or alternatively, a single frusto-conical deflection element.

Referring again to FIG. 2A, the deflection member 18 generally deflects along an axial reference X when a force F (FIG. 2B) is applied. Each deflection element 48 includes a length R and extends along a centerline A of the element 48. The deflection elements form an angle θ which is measured between the reference A and a reference Y. In an exemplary embodiment, angle θ is about 40 degrees when the deflection member 18 is not subject to an external force (FIG. 2A) and the angle θ is about 22 degrees when the deflection member 18 is subject to an external force F (FIG. 2B).

Figure 2B:
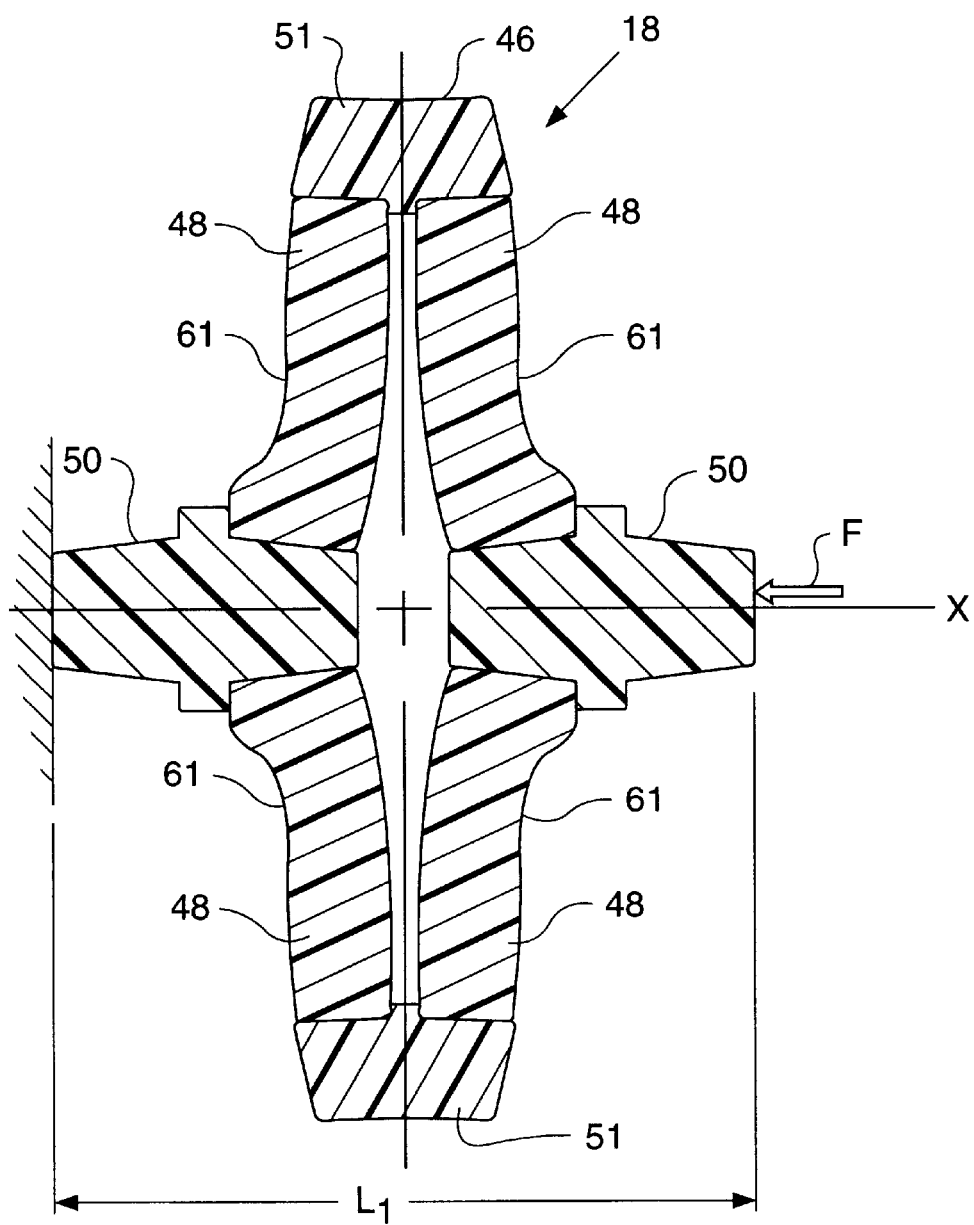
FIG. 2B is a sectional view of the deflection member of FIG. 2A showing the deflection member in a loaded state.

As best shown in FIGS. 2A, 2B each deflection element 48 of the deflection member 18 includes a flexing portion 61 having a radius of curvature $r_C$. Generally, the deflection elements 48 are configured to isolate a substantial portion of the deflection to the flexing portions 61 of the deflection elements 48 when the deflection member 18 is compressed. Further, and with reference to FIG. 2B, it will be understood that the annular base member 46 facilitates further deflection of each deflection element 48. The base member 46, in an unloaded state (FIG. 2A), includes a cross-section 49 which is generally V-shaped, and once loaded (FIG. 2B), the base member 46 includes a cross section 51 which is generally rectangular. Hence, the base member 46 flexes at its center to promote further flexing of each deflection element 48. It will be further understood that the deflection elements 48 and the base member 46 deflect or flex in an elastic region of the material such that permanent deformation of the material is avoided. In an exemplary embodiment, the deflection member 18 is reduced by one-half its length (e.g., $L_1/L_0=\frac{1}{2}$) in response to the force F imparted on the retainer 50. Further, for example, the deflection elements 48 and the base member 46 may be manufactured from TORLON® 4203L, metallic material, composite or other material(s) known by those having ordinary skill in the art. TORLON® is manufactured by Amoco Performance Products, Inc., 4500 McGinnis Ferry Road, Alpharetta Ga. 30202.

Figure 4:
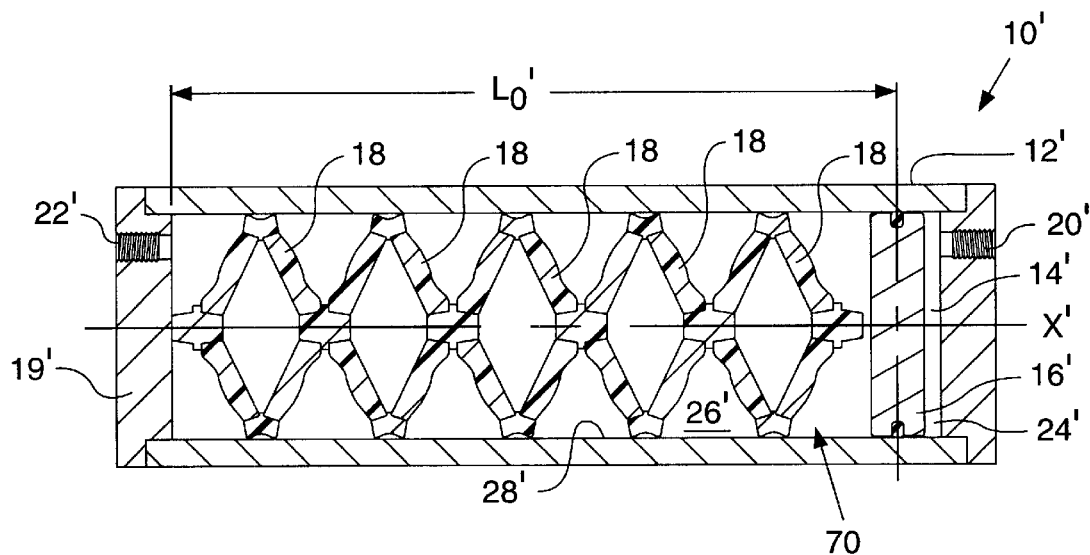
FIG. 4 is a sectional view of a second embodiment of an accumulator according to the present invention showing the deflection member in a first or unloaded position.
Figure 5:
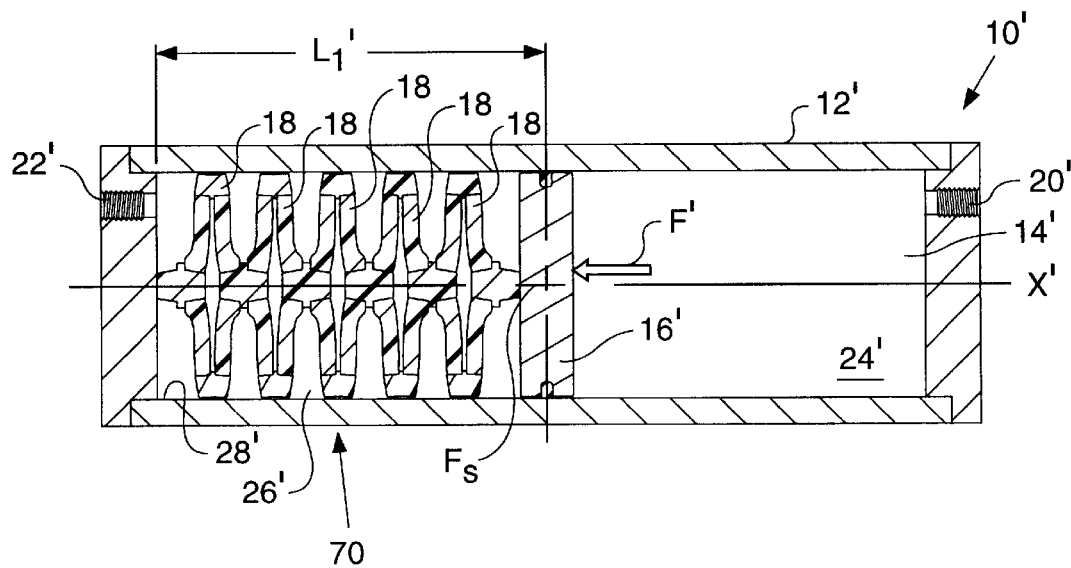
FIG. 5 is a sectional view of the accumulator shown in FIG. 4 showing the deflection member in a second or loaded position

Referring to FIGS. 4 and 5, shown is a second embodiment of an accumulator assembly including multiple connected deflection members 18. As best seen in FIG. 4, five deflection members 18 are connected through four retainers 50 to provide a deflection member assembly 70. The deflection member assembly 70 is provided within the inner cavity 14' of the housing 12'. The inner cavity 14' is separated into a fluid chamber 24' and a spring chamber 26' by a partition 16'. Fluid is received within the fluid chamber 24' through the inlet port 20' to accordingly provide a pressure on the partition 16' and, as a result, a load F' (FIG. 5) is imparted on the deflection member assembly 70. In turn, a resistive force $F_s$ opposes movement of the partition 16'. A relief port 22' is provided in an end 19' of the housing 12' to prevent air or fluid residing in the chamber, for example, from being trapped within the spring chamber 26' and consequently causing an impediment to movement of the partition 16'. It will be understood that the deflection member assembly 70 is provided with the capability of being compressed along the axial reference X' by at least one half of its original length ($L_1'/L_0'=\frac{1}{2}$).

Referring to FIGS. 6A, 6B a typical accumulator spring is shown (FIG. 6A), such as a Bellville spring, and accordingly, the performance characteristics of the spring will be described (FIG. 6B). Since the Bellville spring 72 provide such limited deflection, it is known to stack multiple Bellvilles together to form a deflection member assembly for use within a commonly known accumulator housing or cylinder. Bellville spring 72 may include a diameter "d" and have a through hole of "½ d" diameter, for example. The Bellville spring 72 may include a deflecting height "h" and a thickness "t". As a load is applied to the Bellvile spring 72, as illustrated in FIG. 6A, the height h is urged to decrease as the spring 72 flattens.

Referring to FIG. 6B, shown is a load versus deflection graph 74 for a range of Bellville springs. Generally, as the spring 72 is increasingly thickened and cupped, the deflection capability of the spring increases for a given load. It may be seen that as the ratio of height to thickness "h/t" increases, the useable stable range of the spring 72 increases. However, the ostensible steady range is an insignificant fraction of the entire range of deflection (see h/t=1.41, for example). However, for greater values of h/t the useable deflection range becomes even more narrow due to the sinusoidal nature of the deflection as the spring is initially loaded. As a result, the Bellville spring 72, as it is returning to its original form, provides an undesirably variable force on the fluid being stored within the accumulator. Accordingly, the pressure of the fluid discharged from the accumulator varies significantly which includes an undesirable effect on systems and components downstream of the accumulator.

In contrast, and with reference to FIG. 7, the deflection member 18 (FIG. 1) performs pursuant to a load versus deflection diagram 76, illustrating a generally constant load over substantially the entire range of deflection between $L_0$ and $L_1$. Over the aforesaid deflection range the load or pressure on the fluid within the accumulator remains constant (within 7%). As a result, the system and components (not shown) downstream of the accumulator assembly 10 (FIG. 1) are exposed to constant pressure to facilitate proper and efficient operation of the system.

Industrial Applicability

Referring to FIGS. 4 and 5, in operation, the accumulator assembly 10' may be connected to a fluid system requiring the accumulation, storage and discharge, of pressurized fluid. In such an application, pressurized fluid is introduced into the fluid chamber 24' of the housing 12' through the inlet 20'. Consequently, the fluid pressure creates the force F' on the partition 16'. The deflection member assembly 70 is urged to contract between the partition 16' and the end 19' of the housing 12' when the partition 16' is under the influence of fluid pressure within the fluid chamber 24'. As a result the deflection member assembly 70 is accordingly compressed along the axial reference X'. As the deflection member assembly 70 contracts, the resistive force $F_s$ develops and opposes the motion of the partition 16'. The resistive force $F_s$ remains substantially constant along the entire displacement distance ($L_0'-L_1'$) of the deflection member assembly 70.

The accumulator assembly 10', therefore, receives fluid pressure and, in turn, imparts a loading (e.g., charge) to the received fluid through the deflection member assembly 70. When it is desirable to discharge the pressure within the accumulator assembly 10', the fluid discharges through the input port 20' at a substantially constant rate since the force provided by the deflection member assembly remains substantially constant over the entire range of motion of the deflection member assembly 70. Notably, since there exists a significant range of motion of displacement of the deflection member assembly, the accumulator assembly 10' is capable of discharging a substantial amount of fluid pressure.

Referring to FIG. 1, the operation of the accumulator assembly 10 is similar to the operation of the accumulator assembly 10', however, accumulator assembly 10 includes less fluid volume capabilities based on the range of motion of a single deflection member element 18. In an exemplary embodiment the inside diameter of the housing 12 may be 4.0 inches and the deflection member assembly may include 20 elements on each axial end 40, 42 (40 elements total). Each element may include a length L of 1.5 inches measured along the reference A. If a 4000 psi supply is introduced into the fluid chamber 24, a force of about 50,200 lbs. is generated on the partition 16. In response, the deflection member assembly is compressed along the axial reference X an amount of 0.606", for example.

It is intended that the specification and examples be considered as exemplary only, with a true scope and spirit of the invention being indicated by the following claims.

What is claimed is:

1. An accumulator assembly for managing pressurized fluid, the accumulator assembly comprising:
    a housing extended along an axial reference axis;
    a partition provided in said housing and moveable in response to fluid pressure being imparted on said partition; and
    a deflection member disposed in said housing, said deflection member being displaceable between a first position and a second position, the deflection member comprising:
        at least one deflection element including a first end and a second end and a flexing portion therebetween, wherein said deflection member provides a resistive force between said first and said second positions of said deflection member in response to movement of said partition, said resistive force being substantially constant between said first and said second positions of said deflection member.

2. The accumulator assembly of claim 1 wherein said deflection member includes a plurality of deflection elements, said deflection elements being axially spaced relative an axial centerline of said deflection member.

3. The accumulator assembly of claim 1 further comprising a base member, said first end of said at least one deflection member is supported by said base member.

4. The accumulator assembly of claim 3, wherein said deflection member includes a plurality of deflection elements, said first ends of said deflection elements being supported by said base member.

5. The accumulator assembly of claim 4, wherein said deflection member is positioned within an inner cavity of said housing, said housing defining an inner cavity within said inner cavity of said housing, said deflection member is spaced from said inner surface by an annular gap.

6. The accumulator assembly of claim 1, wherein said deflection member includes a plurality of deflection elements axially arranged relative an axial centerline of said deflection member, a portion of said plurality of deflection elements include first ends supported by a base and second ends extended axially away relative said base, a remaining portion of said plurality of deflection elements include first ends supported by a base and second ends extended axially away and opposite relative to said second ends of said portion of said plurality of deflection elements.

7. The accumulator assembly of claim 6, further comprising at least one retaining member engaged with said second ends of said portion of said plurality of deflection member wherein said second ends are retained by said retaining member.

8. The accumulator assembly of claim 7, further comprising a second retaining member engaged with said second ends of said remaining portion of said plurality of deflection members, wherein said resistive force provided by said deflection element is transmitted through said retaining members.

9. The accumulator assembly of claim 1, wherein said at least one deflection element is configured to direct deflection of said deflection element through said flexing portion of said deflection element in response to a pressure induced for on said partition.

10. The accumulator assembly of claim 1, wherein said at least one deflection element consists of a single annular member.

11. A method for managing pressurized fluid within an accumulator assembly, the accumulator assembly including a housing, a partition provided in said housing and moveable in response to fluid pressure being imparted on said partition, and a deflection member disposed in said housing, the method comprising:
    receiving fluid pressure within said housing;
    displacing said deflection member from a first position to a second position in response to said fluid pressure being received in said housing;
    causing a substantially constant force on said partition through said deflection member between said first and second positions of said deflection member.

12. The method of claim 11, wherein said deflection member includes a plurality of axially arranged deflection elements and the step of displacing said deflection member further comprising:
    urging elastic deformation of each of said plurality of axially arranged deflection elements through a flexing portion defined by deflection element.

* * * * *